N. R. STREETER.
Fluting-Iron.

No. 202,676.　　　　Patented April 23, 1878.

WITNESSES

INVENTOR
Nelson R. Streeter
per
F. A. Lehmann,
ATTORNEY

UNITED STATES PATENT OFFICE.

NELSON R. STREETER, OF GROTON, N. Y.

IMPROVEMENT IN FLUTING-IRONS.

Specification forming part of Letters Patent No. 202,676, dated April 23, 1878; application filed June 2, 1877.

*To all whom it may concern:*

Be it known that I, NELSON R. STREETER, of Groton, in the county of Tompkins and State of New York, have invented certain new and useful Improvements in Fluting-Irons; and I do hereby declare the following to be a full, clear, and exact description of the invention, such as will enable others skilled in the art to which it pertains to make and use it, reference being had to the accompanying drawings, which form part of this specification.

My invention relates to an improvement in a combined smoothing-iron and fluter; and it consists in the arrangement and combination of parts that will be more fully described hereinafter.

The accompanying drawings represent my invention.

Figure 1:
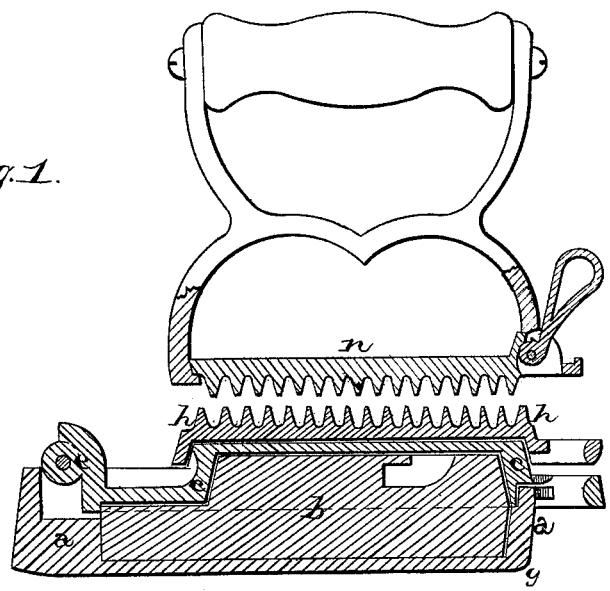
Figure 2:
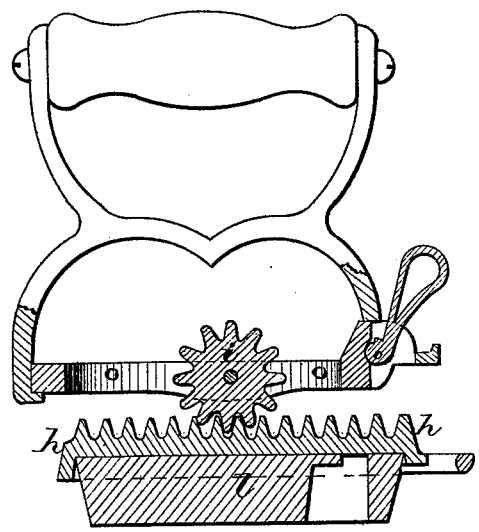

Figure 1 is a longitudinal section of my invention. Fig. 2 is a similar view of the handle, rolling-fluter, fluter-plate, and heater or core.

$a$ represents the iron, which is made hollow to receive a heated core, $b$, and which is provided with a hinge-top, $c$. The hinge $e$ is provided with a stop, so that when the cover has been thrown backward just sufficiently far past the center to make it stand, it is prevented from being thrown too far back, and is always ready to close in an instant. The heel or rear end of this iron is rounded or beveled away at $g$, as shown, so as to form a polisher for shirt-bosoms and other such articles. This iron as here shown and described, is intended to be used in connection with the detachable handle shown and described in my patent of September 19, 1876. In that patent the iron and fluter were combined together in a single piece; but as this is found to be objectionable in some respects, I make the fluter $h$, in this case, separate and detachable from the iron, so that it can be used either in connection with the iron or by itself, and so that each one can be sold independently of the other. For this purpose the fluter is formed with a recess in its bottom of just sufficient size to fit over the top of the hinge top or cover $c$, as shown. By means of this recess this fluter can be used upon the top of the iron, as shown, or there may be a separate and independent heater, $l$, made that can be used with the fluter without any reference whatever to the iron. This heater $l$ is heated, and then placed upon some suitable base, and then the fluter is placed upon the top of this core, where it becomes sufficiently heated to do fluting of any kind. This fluter may either be used in connection with a flat presser, $n$, or with a circular revolving presser that is journaled in the center of a suitable frame, $o$. Both this frame $o$ and the flat presser $n$ are adapted to be used in connection with the combined handle and lifter shown in my former patent. In using the revolving presser $i$, the handle is attached to the frame $o$, and then the presser $i$ is rolled back and forth over the top of the fluter.

Having thus described my invention, I claim—

The flat fluter $h$, having a recess in its under side to fit down over the top of an iron or a core, and provided with a handle or catch at one end, adapted to engage with a handle that has a projection at one end for catching in the handle of the fluter, substantially as set forth.

In testimony that I claim the foregoing I have hereunto set my hand this 25th day of May, 1877.

NELSON R. STREETER.

Witnesses:
DANA RHODES,
HILAND K. CLARK.